United States Patent
Kawamura et al.

(10) Patent No.: US 7,703,787 B2
(45) Date of Patent: Apr. 27, 2010

(54) CAP MEMBER OF SWING ARM FOR REAR WHEEL

(75) Inventors: Hidetaka Kawamura, Akashi (JP);
Norikazu Matsumura, Akashi (JP);
Yukio Okada, Miki (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 265 days.

(21) Appl. No.: 11/472,306

(22) Filed: Jun. 22, 2006

(65) Prior Publication Data
US 2006/0290097 A1  Dec. 28, 2006

(30) Foreign Application Priority Data
Jun. 24, 2005  (JP)  ............... P2005-185134

(51) Int. Cl.
*B62K 25/10* (2006.01)
*B62M 9/16* (2006.01)

(52) U.S. Cl. .................... 280/284; 280/288
(58) Field of Classification Search .............. 280/288, 280/284, 285, 286; 180/227; 474/116, 101; D12/126, 116; 301/124.2, 125, 128; 288/286
See application file for complete search history.

(56) References Cited

U.S. PATENT DOCUMENTS

| | | | |
|---|---|---|---|
| 586,912 A * | 7/1897 | Osmond | 474/116 |
| 972,510 A * | 10/1910 | Cosset | 280/288 |
| 4,540,193 A * | 9/1985 | Noda et al. | 280/284 |
| 5,292,143 A * | 3/1994 | Stauch et al. | 280/279 |
| 5,524,918 A * | 6/1996 | Peabody et al. | 280/291 |
| 5,546,665 A * | 8/1996 | Jackmauh | 33/203 |
| 6,070,897 A * | 6/2000 | Hsieh et al. | 280/291 |
| 6,105,700 A * | 8/2000 | Williams et al. | 180/219 |

FOREIGN PATENT DOCUMENTS

| JP | 56-3343 | * | 1/1981 |
|---|---|---|---|
| JP | 60-110589 | | 6/1985 |
| JP | 63-16991 | | 2/1988 |
| JP | 64-37794 | | 3/1989 |
| JP | 64-067494 | | 3/1989 |
| JP | 2-95998 | * | 4/1990 |
| JP | 2-128985 | | 5/1990 |

* cited by examiner

*Primary Examiner*—Anne Marie M Boehler
(74) *Attorney, Agent, or Firm*—Wenderoth, Lind & Ponack, L.L.P.

(57) ABSTRACT

A cap member of a swing arm for a rear wheel of a vehicle can be structured to provide an excellent outer appearance to the swing arm and to increase strength and be made thinner. The cap member to be attached to a rear end of the swing arm supporting the rear wheel of the vehicle is formed with a rounded outer surface shape which is approximately continuously connected to an outer surface shape of the swing arm.

12 Claims, 7 Drawing Sheets

CAP MEMBER OF SWING ARM FOR REAR WHEEL

BACKGROUND OF THE INVENTION

1. Field of the Invention

The present invention relates to a cap member of a swing arm for a rear wheel of a motorcycle or the like.

2. Description of the Related Art

A motorcycle is structured such that a swing arm for a rear wheel is supported on a vehicle body frame so as to freely oscillate in a vertical direction, the rear wheel is rotatably supported on a rear end of the swing arm, a drive chain is wound around a drive sprocket coaxially attached to the rear wheel, whereby a driving force is transmitted to the rear wheel.

Figure 11:
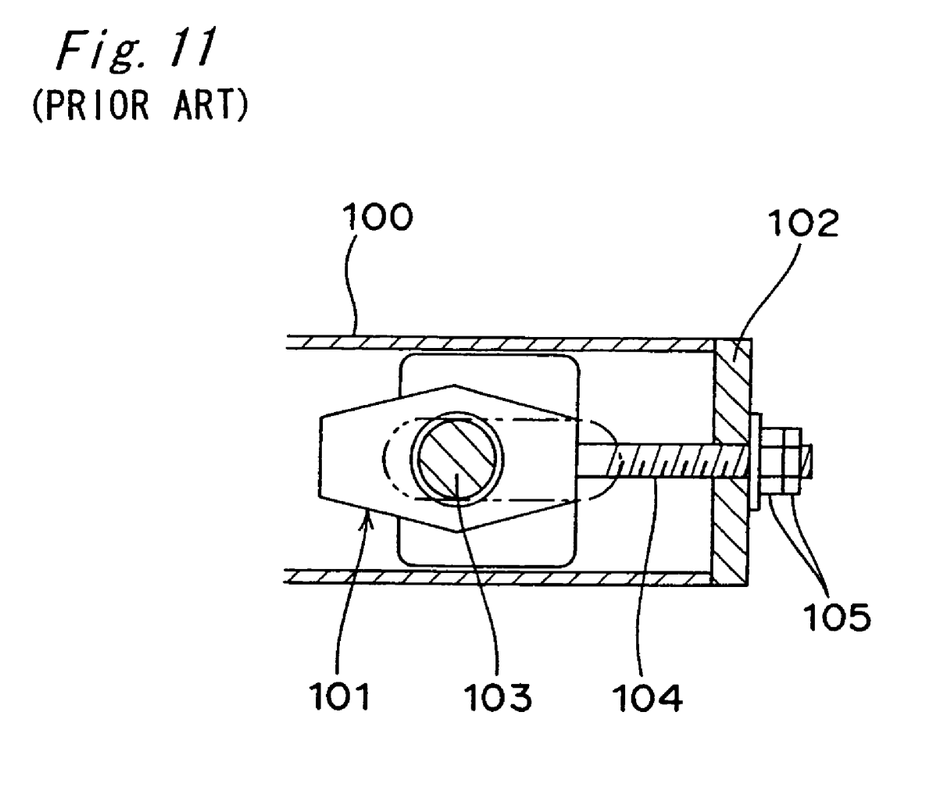
FIG. 11 is an enlarged side elevational view (a partially cross sectional view) of a rear end of a swing arm in accordance with prior art.

As shown in FIG. 11, an adjuster 101 for a drive chain of a rear wheel of a vehicle is inserted to a rear end inner portion of a swing arm 100 for the rear wheel, and a cap member 102 for closing a rear end opening of the swing arm 100 is attached thereto. The adjuster 101 is structured such that a rear axle 103 for the rear wheel passes therethrough, an adjusting bolt 104 of the adjuster is protruded to a rear side of the swing arm 100. The adjusting bolt 104 protrudes from the swing arm 100 through the cap member 102. The cap member 102 is formed in a flat plate shape, and receives an adjusting nut 105 engaged with the adjusting bolt 104 by a rear end surface so as to support the adjuster 101. A tension of the drive chain is adjusted by screwing the adjusting nut 105 forward or backward and executing fine adjustment of a longitudinal position of the adjuster 101.

Japanese Unexamined Utility Model Publication No. 64-37794 also discloses an adjuster for a drive chain which is approximately similar to the one shown in FIG. 11.

In this structure, it is necessary that the cap member 102 be provided with a certain degree of rigidity for receiving a load from the rear axle side via the adjuster 101. Accordingly, the cap member 102 has a certain degree of thickness, and has a great weight in spite of being a simple part.

Further, since the swing arm 100 to which the cap member 102 is attached is formed such that its rear end is cut by a flat surface, and gives an impression that it breaks in the middle, it is hard to say that the swing arm 100 has an excellent outer appearance.

SUMMARY OF THE INVENTION

The present invention addresses the above described condition, and an object of the present invention is to provide a cap member of a swing arm for a rear wheel which gives an excellent outer appearance to the swing arm and can increase strength so as to make it possible to be made thinner.

In order to achieve the object mentioned above, in accordance with the present invention, there is provided a cap member of a swing arm, which supports a rear wheel of the vehicle, attached to a rear end of the swing arm, wherein the cap member has an outer surface shape which is approximately continuously connected to an outer surface shape of the swing arm and is rounded in a longitudinal direction of the swing arm.

In accordance with this structure, it is possible to give an impression that a rear end of the swing arm smoothly converges to a rear side as seen from outside, whereby an outer appearance is improved. Further, rigidity of the cap member is improved by the rounded portion.

Preferably, the cap member may be provided with a tubular outer peripheral wall portion having an outer surface shape which is approximately continuously connected to the outer surface shape of the swing arm, and an end wall portion for closing a rear end side of the outer peripheral wall portion and having a rounded outer surface shape which is approximately continuously connected to the outer surface shape of the outer peripheral wall portion in the longitudinal direction of the swing arm, and an inner portion surrounded by the outer peripheral wall portion and the end wall portion may be formed as a cavity.

In accordance with this structure, since the cap member has the outer peripheral wall portion and the end wall portion, strength can be increased and a thin structure is achieved. Further, since the inner portion of the cap member forms the cavity, it is possible to suppress an increase in weight.

Preferably, a thickness of the end wall portion may be formed thicker than a thickness of the outer peripheral wall portion.

In accordance with this structure, in a case where the cap member is used as a support member of an adjuster for a rear wheel drive chain of the vehicle, while it is possible to secure strength by increasing the thickness of the end wall portion receiving a load from the adjuster by the outer surface, it is possible to minimize any increase in weight by reducing the thickness of the outer peripheral wall portion receiving the load as an axial load.

Preferably, the cap member may have a through hole through which an adjusting bolt of an adjuster, which adjusts tension of a rear wheel drive chain of the vehicle and is installed within the swing arm, passes, and be structured as a receiving member receiving an adjusting nut engaged with the adjusting bolt by an outer surface thereof.

In accordance with this structure, it is possible to suitably receive the load transmitted via the adjuster for the rear wheel drive chain by the cap member. Further, since the outer surface of the rear end of the cap member is formed in the rounded shape, a space around the adjusting nut becomes wider, whereby it is easy to turn the adjusting nut. Accordingly, an adjusting workability of the drive chain is improved.

Preferably, the cap member may have a concave groove communicating an internal space of the swing arm with an external portion of the swing arm at least in a lower end portion of a front end surface thereof, in such a manner as to form a drain hole between the cap member and a rear end portion of the swing arm.

In accordance with this structure, it is possible to discharge water that has intruded into the swing arm via the drain hole formed between the swing arm and the cap member. Further, since the drain hole can be formed only by forming a concave groove on the front end surface of the cap member, it is easy to form or work the drain hole.

Preferably, the cap member may have a step portion, with which the rear end of the swing arm is brought into contact, formed on an outer peripheral edge of a front end of the outer peripheral wall portion, and a fitting portion, with which the rear end portion of the swing arm is fitted, formed in an inner side of the step portion.

In accordance with this structure, it is possible to position the cap member with respect to the swing arm, and maintain a state in which the outer surface shape of the swing arm and the outer surface shape of the cap member are approximately continuously connected.

BRIEF DESCRIPTION OF THE DRAWINGS

This and other objects and features of the present invention will become more clear from the following description taken in conjunction with a preferred embodiment thereof with reference to the accompanying drawings.

DETAILED DESCRIPTION OF THE PREFERRED EMBODIMENT

Figure 1:
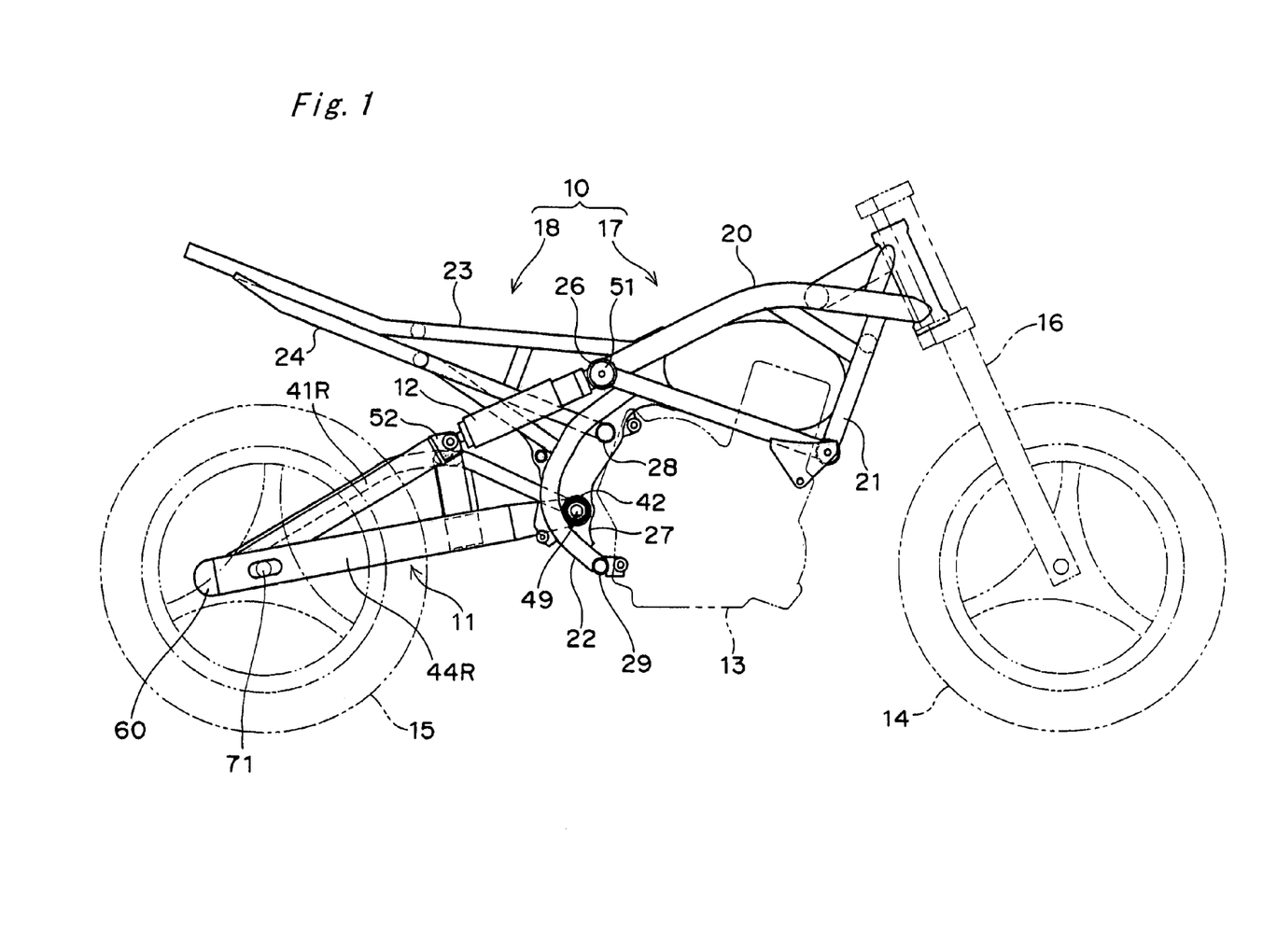
FIG. 1 is a right side elevational view of a vehicle body frame and the like of a motorcycle in accordance with an embodiment of the present invention.

FIG. 1 is a right side elevational view of a vehicle body frame and the like of a motorcycle in accordance with an embodiment of the present invention. In the figure, a vehicle body frame 10, a swing arm 11 and a rear suspension 12 are shown by solid lines, and an engine 13, front and rear wheels 14 and 15, a front fork 16 and the like are shown by virtual lines, and other portions are omitted.

The vehicle body frame 10 is mainly structured by a front frame body 17 arranged on a front side, and a rear frame body 18 arranged on a rear side. The front frame body 17 is provided with a pair of right and left main frame members 20, a pair of right and left sub frame members 21 arranged on a lower side of the right and left main frame members 20, and a pair of right and left lower frame members (bracket members) 22 extending to a lower side from a rear end portion of the main frame members 20. The rear frame body 18 is provided with a pair of right and left rear frame members 23 extending to a rear side from rear end portions of the right and left main frame members 20, and a pair of right and left rear auxiliary frame members 24 arranged on a lower side of the right and left rear frame members 23. Each of the front and rear frame bodies 17 and 18 includes a plurality of cross members and a plurality of connection frame members extending in a lateral direction of the motorcycle in addition to the elements mentioned above. Each of the frame members is formed by a circular or rectangular pipe member.

Rear end portions of the right and left main frames 20 and rear end portions of the right and left sub frames 21 are coupled by a center cross member 26 extending in the lateral direction. A support bracket 27 is provided on a front side of each of the right and left lower frame members 22, and the right and left support brackets 27 are coupled by an auxiliary cross member 28 extending in the lateral direction. The right and left lower frame members 22 are coupled by a lower cross member 29 extending in the lateral direction. An engine 13 is mounted and supported to the auxiliary cross member 28, the lower cross member 29 and the sub frame member 21 via brackets.

[Structure of Swing Arm]

Figure 2:
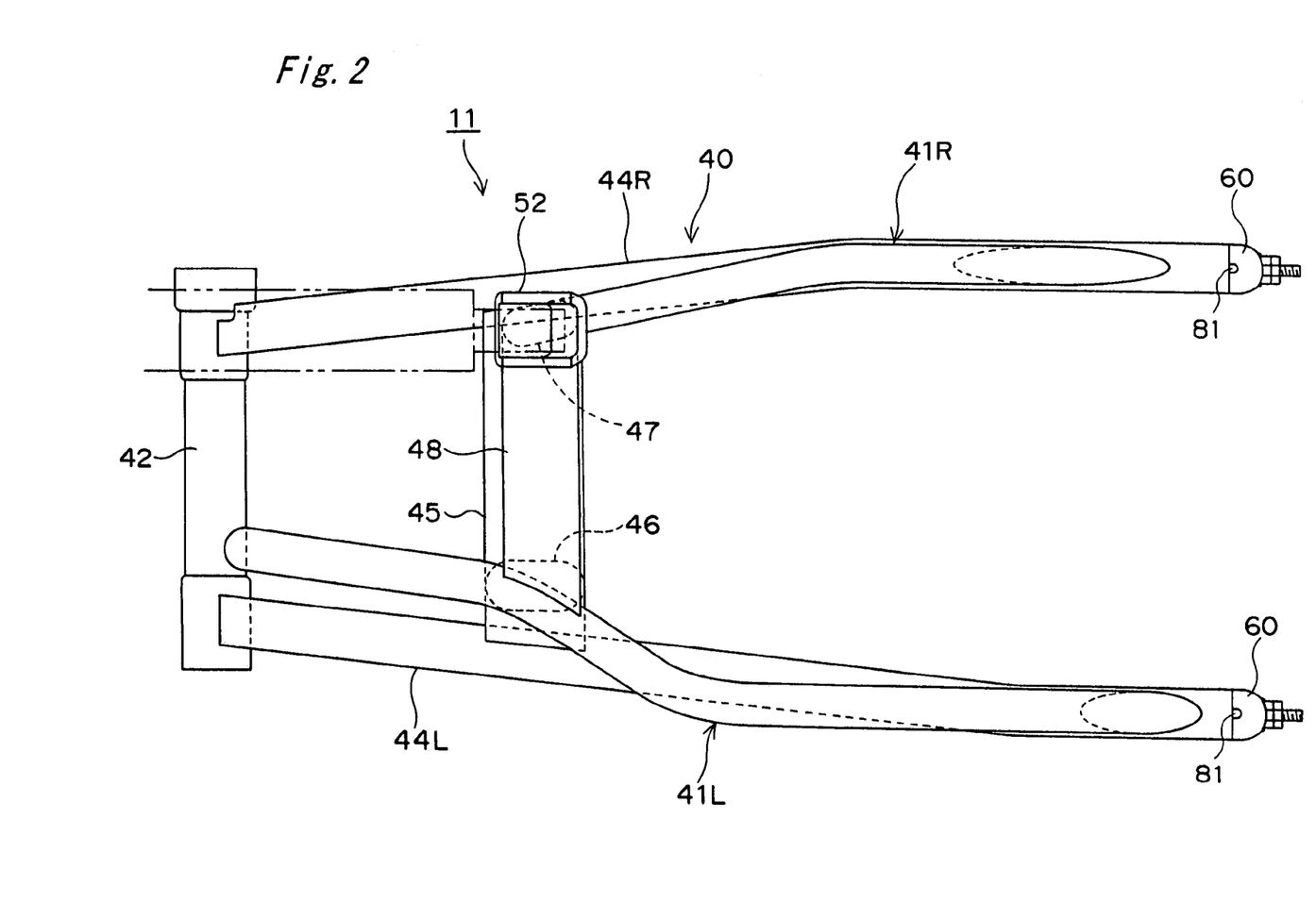
FIG. 2 is a plan view of a swing arm of the motorcycle in FIG. 1.
Figure 3:
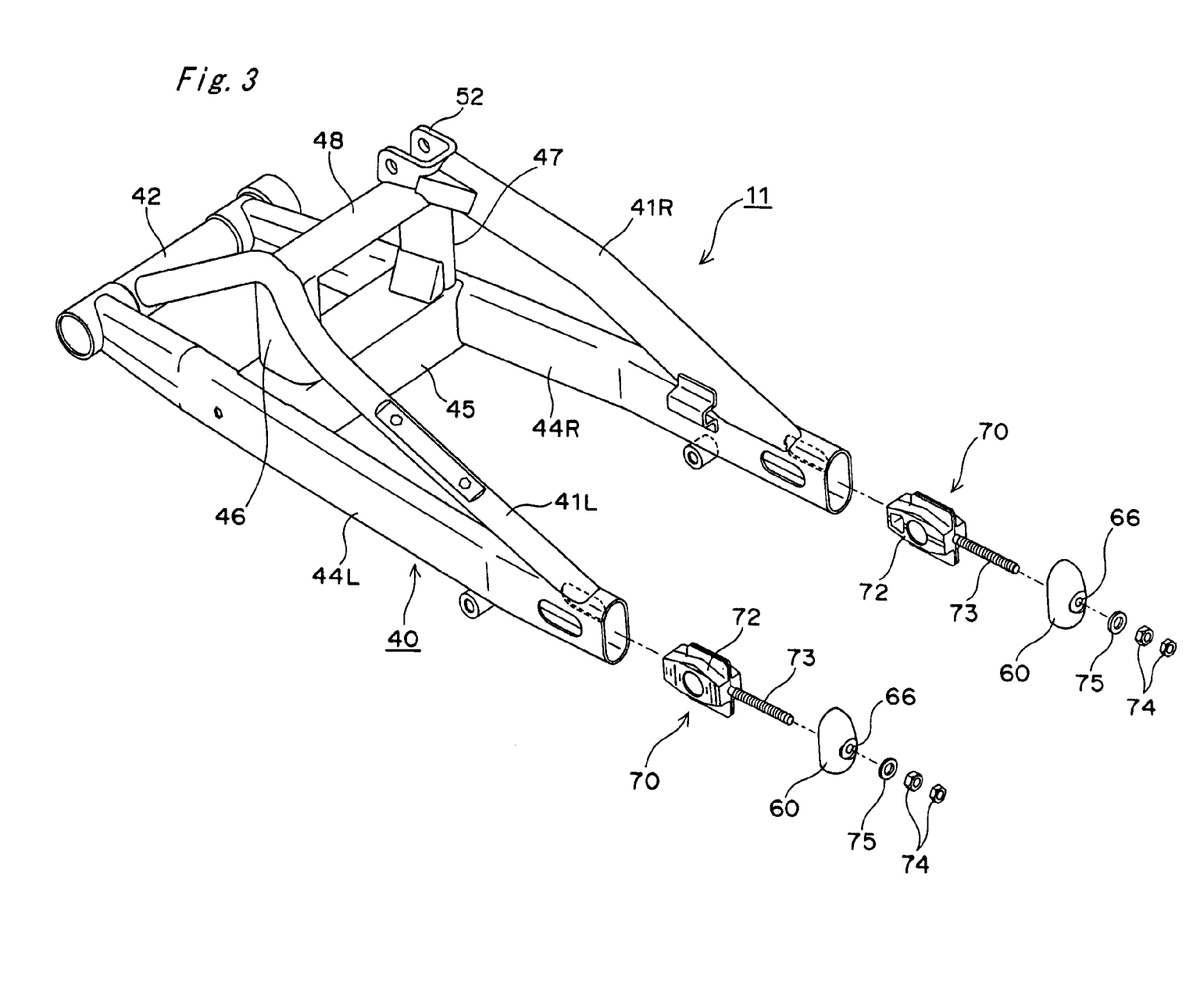
FIG. 3 is an exploded perspective view of the swing arm.

FIG. 2 is a plan view of the swing arm 11, and FIG. 3 is an exploded perspective view of the swing arm 11. The swing arm 11 is structured by an arm main body 40, left and right stabilizer members 41L and 41R provided on an upper side of the arm main body 40, a pivot tube 42 provided on a front end portion of the arm main body 40, and the like.

The arm main body 40 has a pair of left and right arm members 44L and 44R extending in a longitudinal direction, and a cross member 45 coupling longitudinal middle portions of the left and right arm members 44L and 44R to each other. Both the arm members 44L and 44R are arranged so as to be spaced from each other in the lateral direction of the motorcycle. A rear axle (not shown) is supported to rear end portions of both the arm members 44L and 44R. Both the arm members 44L and 44R are formed by a hollow pipe member having a vertically long oval cross sectional shape.

The respective left and right stabilizer members 41L and 41R are provided in a state of being approximately along the respective left and right arm members 44L and 44R as seen from above. A rear end of the left stabilizer member 41L is connected to a rear upper surface of the left arm member 44L, a front end of the left stabilizer member 41L is connected to the pivot tube 42, and a longitudinal middle portion of the left stabilizer member 41L is bent in an upward chevron shape. The bent portion of the left stabilizer member 41L is coupled to the cross member 45 via a support member 46 extending vertically.

The right stabilizer member 41R is structured such that a rear end is connected to a rear upper surface of the right arm member 44R, and diagonally extends toward a front upper side. A front end of the right stabilizer member 41R is coupled to the cross member 45 via a support member 47 extending vertically. Further, the right support member 47 and the left support member 46 are coupled by a reinforcing member (a cross member) 48 extending in the lateral direction.

As shown in FIG. 1, the swing arm 11 is supported on the lower frame member 22 so as to freely oscillate in a vertical direction, by inserting the pivot tube 42 between the left and right support brackets (the pivot brackets) 27, inserting a pivot shaft 49 from a side and fixing and supporting left and right end portions of the shaft 49 by bolt and nut.

A front support boss 51 is provided on a right end of the center cross member 26, a rear support boss 52 is provided on a front end portion of the right stabilizer member 41R, and a front end portion and a rear end portion of the rear suspension 12 are supported pivotally on the front and rear support bosses 51 and 52.

[Structure of Rear End Portion (Cap Member 60) of Swing Arm]

Figure 4:
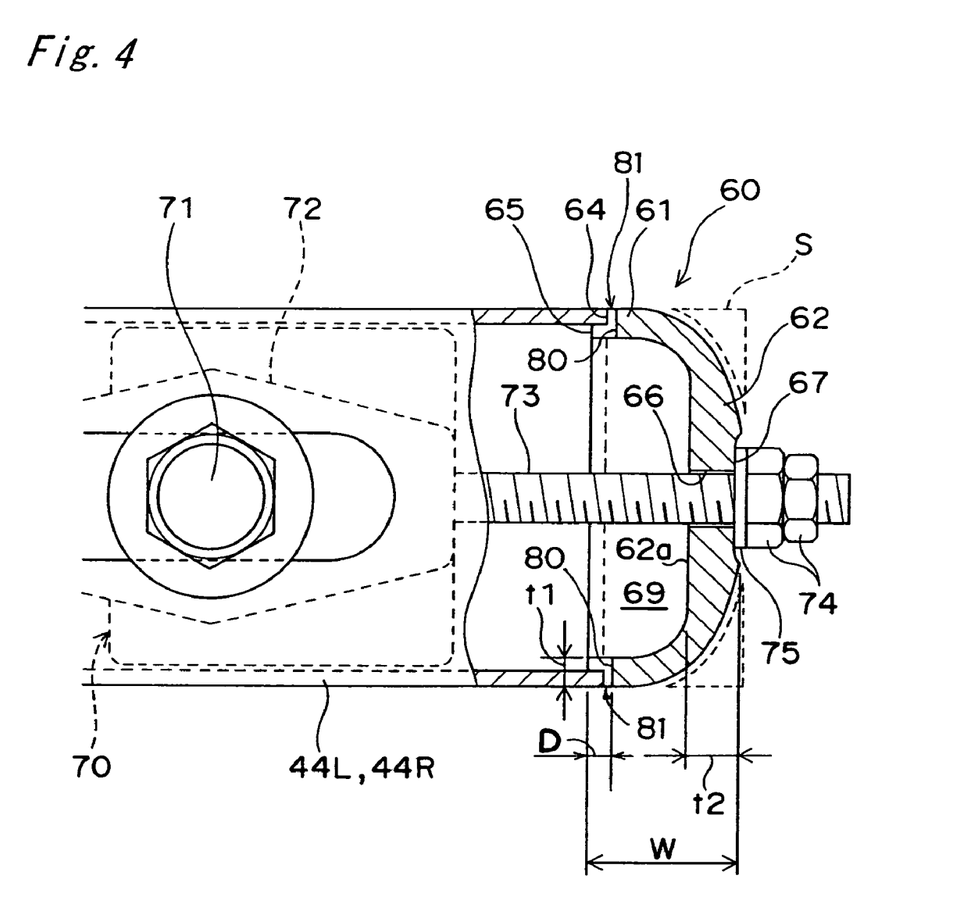
FIG. 4 is an enlarged side elevational view (a partially cross sectional view) of a rear end of the swing arm.
Figure 5:
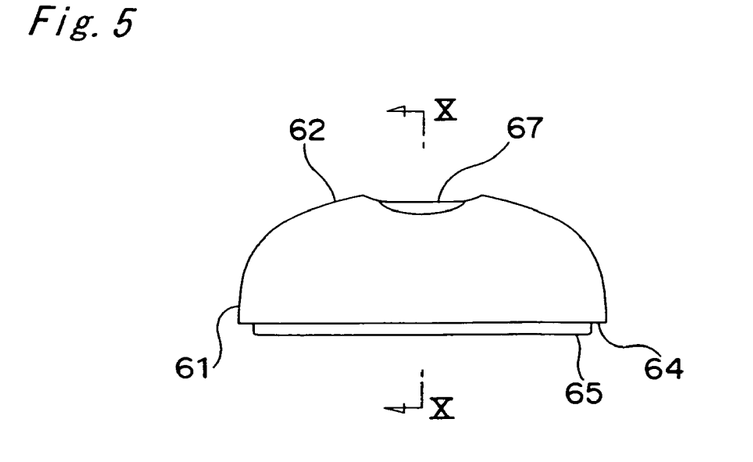
FIG. 5 is a front elevational view (or a back elevational view) of a cap member of the swing arm.
Figure 6:
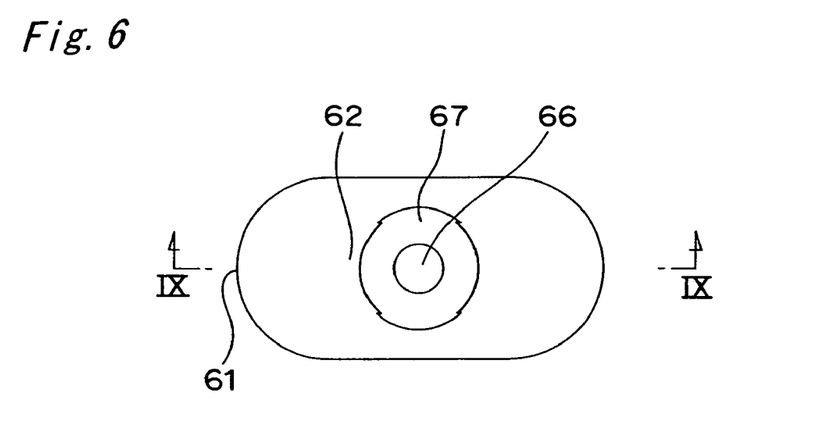
FIG. 6 is a plan view of the cap member.
Figure 7:
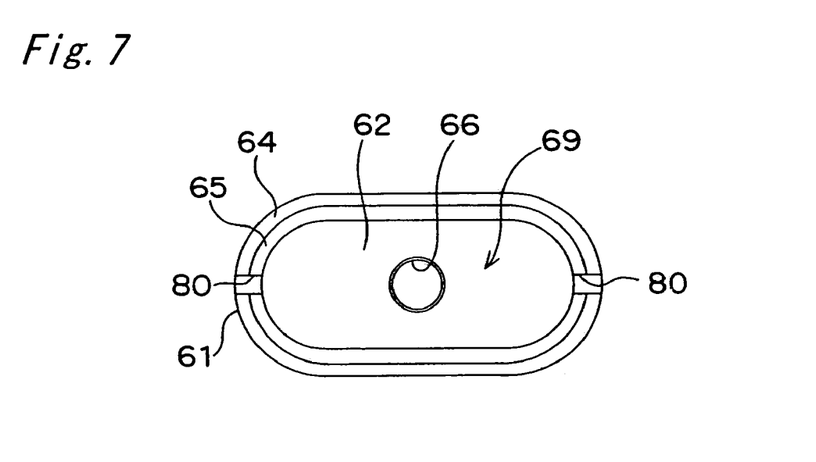
FIG. 7 is a bottom elevational view of the cap member.
Figures 8, 9:
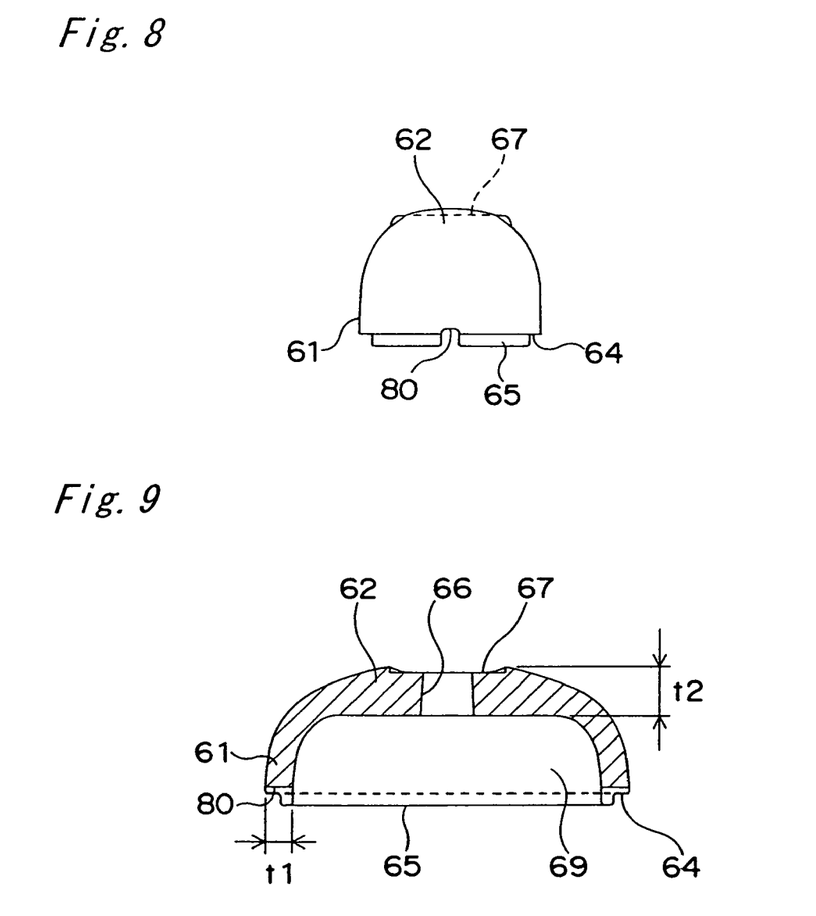
FIG. 8 is a right side elevational view (or a left side elevational view) of the cap member.
FIG. 9 is a cross sectional view as seen from an arrow IX-IX in FIG. 6.
Figure 10:
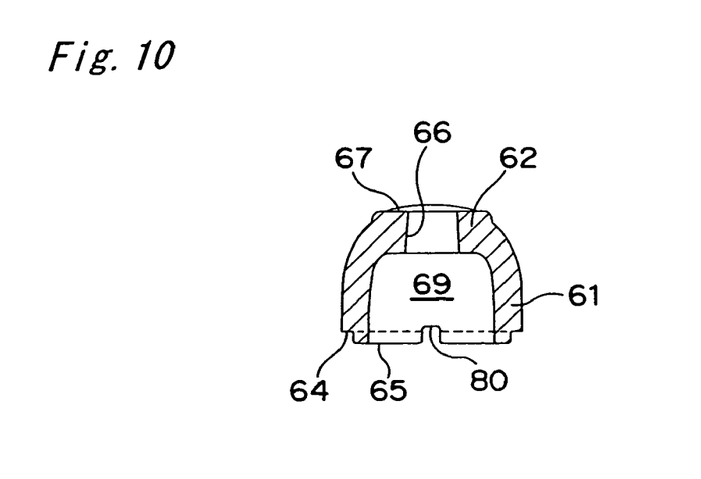
FIG. 10 is a cross sectional view as seen from an arrow X-X in FIG. 5.

As shown in FIGS. 1 to 3, a cap member 60 is attached to a rear end portion of each of the arm members 44L and 44R of the swing arm 11. FIG. 4 is an enlarged side elevational view (a partially cross sectional view) of a rear end of the swing arm, FIG. 5 is a front elevational view (or a back elevational view) of the cap member 60, FIG. 6 is a plan view of the cap member 60, FIG. 7 is a bottom elevational view of the cap member 60, and FIG. 8 is a right side elevational view (or a left side elevational view) of the cap member 60. FIG. 9 is a cross sectional view as seen from an arrow IX-IX in FIG. 6, and FIG. 10 is a cross sectional view as seen from an arrow X-X in FIG. 5.

As shown in FIG. 4, the cap member 60 is formed in an approximately bowl shape, is structured by an outer peripheral wall portion 61 and an end wall portion 62, and is formed by a die casting or a forging of an aluminum alloy or the like.

The outer peripheral wall portion 61 is formed in a tubular shape, and the outer surface thereof is formed in a shape which is approximately flush with and approximately continuously connected to the outer surfaces of the arm members 44L and 44R, that is, an oval shape.

The end wall portion 62 closes a rear end portion of the outer peripheral wall portion 61, and the outer surface thereof is approximately continuously connected to the outer surface of the outer peripheral wall portion 61 and is formed in a rounded spherical shape. In other words, the cap member 60 is structured such that in a state where the cap member 60 is attached to the rear end of the swing arm 11, an upper portion and a lower portion at the rear end as seen from the side are rounded, and a left portion and a right portion at the rear end as seen from above are rounded (FIG. 8). Further, the cap member 60 is formed in a vertically and laterally symmetrical shape.

An inner portion of the cap member 60 forms a cavity 69 surrounded by the outer peripheral wall portion 61 and the end wall portion 62, and a front end of the outer peripheral wall portion 61 is open. Accordingly, the cavity 69 is communicated with the inner hollow portions of the arm members 44L and 44R.

A thickness t1 of the outer peripheral wall portion 61 is formed thicker than a thickness of the arm members 44L and 44R, and a thickness t2 of the end wall portion 62 is formed thicker than the thickness t1 of the outer peripheral wall portion 61. On a boundary between the outer peripheral wall portion 61 and the end wall portion 62, respective inner surfaces and outer surfaces are curved so as to be approximately continuously connected, and the thickness is gradually changed in such a manner that the cross section smoothly changes. A center portion of the inner surface of the end wall portion 62 is formed as a flat surface 62a.

A step portion 64 having a depressed shape toward an inner side is formed on an outer peripheral edge of the front end of the outer peripheral wall portion 61, and a fitting portion 65 protruding to a front side is formed in an inner side of the step portion 64. The fitting portion 65 has an outer surface shape fitted into the inner hollow portion of the arm members 44L and 44R while hardly having any gap. The step portion 64 abuts against the rear end edges of the arm members 44L and 44R.

As shown in FIGS. 3 and 4, an adjuster 70 for adjusting a rear wheel drive chain (not shown) is inserted to the rear end inner portions of the arm members 44L and 44R. The adjuster 70 is provided with an adjusting bolt 73 so as to protrude to a rear side from a main body portion 72 of the adjuster 70 into which a rear axle 71 is inserted, and is structured such that an adjusting nut 74 is engaged with the adjusting bolt 73. The adjusting bolt 73 passes through the end wall portion 62 of the cap member 60 via a through hole 66, and protrudes to a rear side from the cap member 60.

An approximately flat seat portion 67 is formed on an outer surface of the end wall portion 62 of the cap member 60, and the adjusting nut (the double nut) 74 engaged with the adjusting bolt 73 is supported by the seat portion 67 via a washer 75. The through hole 66 and the seat portion 67 are formed in a most rearward bulging portion in a vertically and laterally center portion of the end wall portion 62.

As shown in FIGS. 4, 7 and 8, a concave groove 80 is provided on upper and lower end portions of the front end outer surface of the outer peripheral wall portion 61. The concave groove 80 is open to the front and in a vertical direction, and has a depth D (shown in FIG. 4) extending to the rear side from the front end of the fitting portion 65 over the step portion 64. The concave groove 80 is structured so as to form a drain hole 81 (also shown in FIG. 2) when the cap members 60 are attached to the rear ends of the arm members 44L and 44R.

Further, the same color paint is applied to both the swing arm 11 and the cap member 60.

[Operation and Effect Relating to Rear End Portion (Cap Member) of Swing Arm]

(1) Since the cap member 60 is structured such that the outer surface of the outer peripheral wall portion 61 is approximately continuously connected from the outer surfaces of the arm members 44L and 44R, and the outer surface of the end wall portion 62 is approximately continuously connected from the outer peripheral wall portion 61 and is formed in a rounded shape, no corner is formed on the rear ends of the arm members 44L and 44R, and it is possible to give an impression that the cap member 60 smoothly converges to the rear side as seen from outside. Accordingly, an outer appearance can be improved.

(2) Since the cap member 60 is structured by the outer peripheral wall portion 61 and the rounded end wall portion 62, strength of the cap member 60 becomes higher in comparison with the conventional structure, whereby it is possible to achieve the thin structure. Further, since the inner portion of the cap member 60 is formed as the cavity 69, it is possible to minimize any increase in weight even if the longitudinal width W (FIG. 4) is increased.

(3) Since the thickness t2 of the end wall portion 62 receiving a load transmitted from the rear axle 71 via the adjuster 70 is made large, and the thickness t1 of the outer peripheral wall portion 61 receiving the load as an axial load is made small, it is possible to minimize any increase in weight as a whole.

(4) Since the cross sectional shape of the cap member 60 is smoothly changed in the boundary portion between the outer peripheral wall portion 61 and the end wall portion 62, stress concentration is inhibited.

(5) Since the outer surface of the end wall portion 62 is rounded, and the wide space S (FIG. 4) is formed at the periphery of the adjusting nut 74 in comparison with the conventional structure, the adjusting nut 74 is easily turned and the adjusting work of the drive chain is easily executed.

(6) Since the drain hole 81 is formed between the cap member 60 and the rear end of each of the arm members 44L and 44R by the concave groove 80 formed on the front end outer peripheral edge of each cap member 60, it is possible to discharge water that has intruded into the arm members 44L and 44R via the drain hole 81. Further, since the drain hole 81 can be provided by merely forming the concave groove 80 without piercing any hole in the cap member 60, it is easy to form or manufacture the cap member 60. Further, if the concave groove 80 is formed on both the upper and lower ends of the cap member 60, the drain hole 81 can be formed on the lower end even if the cap member 60 is inverted up and down so as to be attached to the arm members 44L and 44R.

(7) Since the step portion 64 is formed on the outer peripheral edge of the front end of the cap member 60, the fitting portion 65 is formed in the inner side of the step portion 64, the rear ends of the arm members 44L and 44R are brought into contact with the step portion 64, and the fitting portion 65 is fitted into the rear end inner hollow portion of the arm members 44L and 44R, it is possible to easily position the cap member 60 in such a manner that the cap member 60 is not deviated from the arm members 44L and 44R.

Other Embodiments (1) The cap member 60 previously mentioned is structured such that the cavity 69 is formed in the inner portion, however, the cap member 60 may be structured as a solid structure by omitting the cavity.

(2) The arm members 44L and 44R of the swing arm 11 previously mentioned are structured by pipe members each having an oval cross sectional shape. However, each arm member may be structured by a pipe member having a rectangular shape, a square shape, a circular shape or the like. In this case, the cap member 60 can be appropriately changed in correspondence to the shape of the arm members 44L and 44R.

(3) The seat portion 67 of the cap member 60 is formed by a little depression at the rear end top portion of the cap member 60. However, the seat portion 67 may be formed by a little protrusion at the rear end top portion.

(4) In a case where the adjuster 70 is not provided, the cap member 60 may be structured so as to simply close the rear ends of the arm members 44L and 44R.

(5) The cap member 60 may be formed by iron, stainless steel, titanium alloy, magnesium alloy, synthetic resin or the like, without being limited to aluminum alloy. Further, the manufacturing method for manufacturing the cap member 60 may employ cutting, pressing, forging or the like.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A cap member for attaching to a rear end of a swing arm which supports a rear wheel of a vehicle, said cap member comprising:
    a tubular outer peripheral wall portion having an outer surface shape which is approximately continuously connected to said outer surface shape of the swing arm;
    an end wall portion which closes a rear end side of said tubular outer peripheral wall portion, said end wall portion having a generally convex and rounded outer surface shape which is approximately continuously connected to said outer surface shape of said tubular outer peripheral wall portion in a longitudinal direction of the swing arm;
    an inner portion surrounded by said tubular outer peripheral wall portion and said end wall portion so as to form a cavity; and
    a drain hole formed as a concave groove, said drain hole being arranged so as to communicate an internal space of the swing arm with an external portion of the swing arm,
    wherein said cap member has an outer surface shape which is approximately continuously connected to an outer surface shape of the swing arm and is rounded in a longitudinal direction of the swing arm, and
    wherein said drain hole is disposed at a lower end portion of a front end surface of said cap member such that a thru-hole is formed between said cap member and a rear end of the swing arm, said thru-hole allowing fluid communication between an interior of the swing arm and an exterior of the swing arm.

2. The cap member of claim 1, wherein said end wall portion has a thickness which is formed thicker than a thickness of said tubular outer peripheral wall portion.

3. The cap member of claim 1, further comprising:
    a through hole formed in said cap member through which an adjusting bolt of an adjuster passes, the adjusting bolt being provided for extending into the swing arm and adjusting tension of a rear wheel drive chain of the vehicle, and
    wherein said cap member is structured as a receiving member receiving an adjusting nut engaged with the adjusting bolt by an outer surface thereof.

4. The cap member of claim 3, wherein a thickness of said end wall portion at said through hole is thicker than a thickness of said tubular outer peripheral wall portion.

5. The cap member of claim 1, further comprising:
    a step portion formed on an outer peripheral edge of a front end of said tubular outer peripheral wall portion, said step portion being disposed so as to contact the rear end portion of the swing arm, and
    a fitting portion formed in an inner side of said step portion, said fitting portion being disposed so as to be fitted into the rear end portion of the swing arm.

6. The cap member of claim 5, wherein said concave groove extends through said step portion and through said fitting portion.

7. The cap member of claim 1, wherein
    said cap member is configured such that, when viewed in side elevation, an upper portion thereof has a rounded outer profile shape and a lower portion thereof has a rounded outer profile shape, and such that, when viewed in top view from above, each of two side portions thereof has a rounded outer profile shape.

8. The cap member of claim 1, wherein an outer surface of said cap member smoothly converges toward a rear end thereof.

9. The cap member of claim 1, wherein at a boundary between said tubular outer peripheral wall portion and said end wall portion, respective inner surfaces and respective outer surfaces of said tubular outer peripheral wall portion and said end wall portion of said cap member are curved in a manner so as to be approximately continuously connected; and
    a thickness of said cap member changes gradually in such a manner that a cross section changes smoothly.

10. The cap member of claim 1, further comprising:
    a seat portion configured to accept an adjusting nut which engages an adjusting bolt, said seat portion being a flat surface formed as a recess in said generally convex and rounded outer surface shape of said end wall portion; and
    a through hole formed in said seat portion through which the adjusting bolt of an adjuster passes, the adjusting bolt being operable to extend into the swing arm and adjust tension of a rear wheel drive chain of the vehicle.

11. The cap member of claim 1, further comprising:
    a seat portion configured to accept an adjusting nut which engages an adjusting bolt, said seat portion being a flat surface formed as a recess in said generally convex and rounded outer surface shape of said end wall portion; and
    a through hole formed in said seat portion through which the adjusting bolt of an adjuster passes, the adjusting bolt being operable to extend into the swing arm and adjust tension of a rear wheel drive chain of the vehicle, wherein a thickness of said end wall portion at said seat portion is greater than a thickness of said tubular outer peripheral wall portion.

12. A cap member for attaching to a rear end of a swing arm which supports a rear wheel of a vehicle, said cap member comprising:

a tubular outer peripheral wall portion having an outer surface shape which is approximately continuously connected to the outer surface shape of the swing arm;

an end wall portion which closes a rear end side of said tubular outer peripheral wall portion, said end wall portion having a generally convex and rounded outer surface shape which is approximately continuously connected to said outer surface shape of said tubular outer peripheral wall portion in the longitudinal direction of the swing arm;

an inner portion surrounded by said tubular outer peripheral wall portion and said end wall portion so as to form a cavity;

a drain hole formed as a concave groove, said drain hole being arranged so as to communicate an internal space of the swing arm with an external portion of the swing arm;

a step portion formed on an outer peripheral edge of a front end of said tubular outer peripheral wall portion, said step portion being disposed so as to contact the rear end portion of the swing arm;

a fitting portion formed in an inner side of said step portion, said fitting portion being disposed so as to be fitted into the rear end portion of the swing arm;

a seat portion configured to accept an adjusting nut which engages an adjusting bolt, said seat portion being a flat surface formed as a recess in said generally convex and rounded outer surface shape of said end wall portion; and a through hole formed in said seat portion through which the adjusting bolt of an adjuster passes, the adjusting bolt being operable to extend into the swing arm and adjust tension of a rear wheel drive chain of the vehicle, wherein a thickness of said end wall portion at said seat portion is greater than a thickness of said tubular outer peripheral wall portion, wherein said concave groove extends through said step portion and through said fitting portion, and wherein said cap member has an outer surface shape which is approximately continuously connected to an outer surface shape of the swing arm and is rounded in a longitudinal direction of the swing arm.

* * * * *